(12) United States Patent
Ludden

(10) Patent No.: US 9,465,482 B2
(45) Date of Patent: Oct. 11, 2016

(54) DISPLAY GUARDING TECHNIQUES

(71) Applicant: Synaptics Incorporated, San Jose, CA (US)

(72) Inventor: Christopher A. Ludden, Pittsford, NY (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/635,927

(22) Filed: Mar. 2, 2015

(65) Prior Publication Data

US 2015/0193082 A1    Jul. 9, 2015

Related U.S. Application Data

(63) Continuation of application No. 14/067,792, filed on Oct. 30, 2013, now Pat. No. 9,007,343.

(60) Provisional application No. 61/885,473, filed on Oct. 1, 2013.

(51) Int. Cl.
*G06F 3/041* (2006.01)
*G06F 3/045* (2006.01)
*G06F 3/044* (2006.01)

(52) U.S. Cl.
CPC ............ *G06F 3/0418* (2013.01); *G06F 3/044* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 7,417,441 B2 | 8/2008 | Reynolds | |
| 7,583,092 B2 | 9/2009 | Reynolds et al. | |
| 9,229,589 B2 | 1/2016 | Lee et al. | |
| 9,229,599 B2 | 1/2016 | Lee et al. | |
| 2007/0268026 A1 | 11/2007 | Reynolds | |
| 2008/0062148 A1 | 3/2008 | Hotelling et al. | |
| 2010/0001973 A1 | 1/2010 | Hotelling et al. | |
| 2010/0193257 A1 | 8/2010 | Hotelling et al. | |
| 2010/0194695 A1 | 8/2010 | Hotelling et al. | |
| 2010/0308844 A1 | 12/2010 | Day et al. | |
| 2011/0043482 A1 | 2/2011 | Philipp | |
| 2011/0284949 A1 | 11/2011 | Meng et al. | |
| 2011/0298746 A1 | 12/2011 | Hotelling | |
| 2012/0182251 A1 | 7/2012 | Krah | |
| 2013/0044282 A1 | 2/2013 | Kuwabara et al. | |
| 2013/0215075 A1 | 8/2013 | Lee et al. | |
| 2013/0321296 A1 | 12/2013 | Lee et al. | |

OTHER PUBLICATIONS

Phillippe Lambinet, Fogale nanotech, presentation materials dared, May 22, 2013, France.

*Primary Examiner* — Kenneth Bukowski
(74) *Attorney, Agent, or Firm* — Patterson + Sheridan LLP

(57) ABSTRACT

Embodiments described herein mitigate the effect of a coupling capacitance between a sensor electrode in a touch sensor and a display electrode in a display screen. An input device, which includes the touch sensor and display screen, may transmit a guarding signal on the display electrodes when performing capacitive sensing. In one embodiment, the guarding signal may have similar characteristics as a modulated signal (e.g., similar amplitude and/or phase) driven on the sensor electrode to detect interaction between the input device and an input object. By driving a guarding signal that is similar to the modulated signal onto the display electrodes, the voltage difference between the sensor electrode and display electrode remains the same. Accordingly, the coupling capacitance between the sensor electrode and the display electrode does not affect a capacitance measurement used to detect the user interaction.

20 Claims, 11 Drawing Sheets

DISPLAY GUARDING TECHNIQUES

CROSS-REFERENCE TO RELATED APPLICATION

This application is a continuation of U.S. patent application Ser. No. 14/067,792, filed Oct. 30, 2013, entitled "DISPLAY GUARDING TECHNIQUES" which claims benefit of U.S. Provisional Patent Application Ser. No. 61/885,473, filed Oct. 1, 2013 entitled "DISPLAY GUARDING TECHNIQUES" which are each herein incorporated by reference.

BACKGROUND OF THE INVENTION

1. Field of the Invention

Embodiments of the present invention generally relate to managing parasitic capacitance when performing capacitive sensing, and more specifically, to transmitting a guarding signal on display electrodes for managing parasitic capacitance.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is an input device that includes a plurality of sensor electrodes that establish a sensing region of the input device and at least one display electrode configured to, during display updating, set a voltage associated with a pixel of a display device. The input device further includes processing system coupled to the plurality of sensor electrodes and the at least one display electrode to drive a modulated signal onto a first sensor electrode of the plurality of sensor electrodes to acquire a change in capacitive coupling between an input object and the first sensor electrode during a first period and operate the at least one display electrode in a guard mode to mitigate an effect of a coupling capacitance between the first sensor electrode and the at least one display electrode during the first period.

Another embodiment described herein is a method for mitigating an effect of a coupling capacitance associated with a display electrode when performing capacitive sensing. The method driving a modulated signal onto a first sensor electrode of a plurality of sensor electrodes to detect a change in capacitive coupling between an input object and the first sensor electrode during a first period. The method also includes operating the display electrode in a guard mode to mitigate the effect of the coupling capacitance between the first sensor electrode and the display electrode during the first period.

Another embodiment described herein is a processing system for an input device. The processing system includes a display driver module comprising display driver circuitry coupled to at least one display electrode and configured to drive the at least one display electrode to set a voltage associated with a pixel of a display device and operate the at least one display electrode in a guard mode to mitigate the effect of the coupling capacitance between a first sensor electrode of a plurality of sensor electrodes and the at least one display electrode during a first time period. During the first time period, the first sensor electrode is driven with a modulated signal to detect a change in capacitance between the first sensor electrode and an input object.

Another embodiment described herein is a processing system for an input device. The processing system includes a sensor module comprising sensor circuitry and is coupled to a plurality of sensor electrodes. The sensor module is configured to drive, during a first time period, one of the plurality of sensor electrodes with a modulated signal to detect a change in capacitive coupling between the one sensor electrode and an input object. The sensor module is coupled to and synchronized with a display driver module that is configured to operate at least one display electrode in a guard mode to mitigate the effect of a coupling capacitance between the one sensor electrode and the at least one display electrode during the first time period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1A:
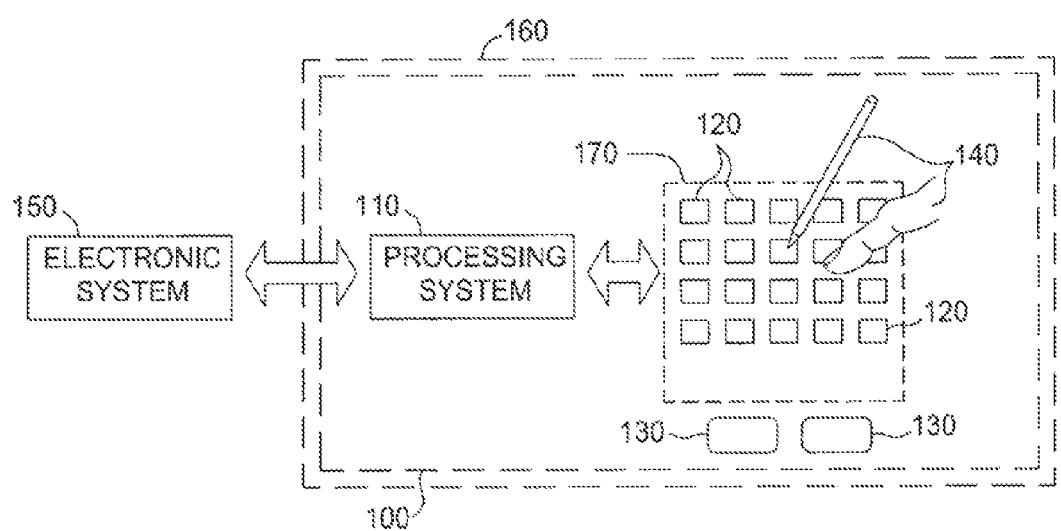
FIG. 1A is a schematic block diagram of an input device integrated into an exemplary display device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability.

An input device may include sensor electrodes that are used as sensing elements to detect interaction between the input device and an input object (e.g., a stylus or a user's finger). To do so, the input device may drive a capacitive sensing signal onto the sensor electrodes. Based on measuring capacitances associated with driving the capacitive sensing signal, the input device determines a location of user interaction with the input device. In one embodiment, the electrodes may be located proximate to other electrodes in the input device. For example, the input device may include a display screen for outputting an image to the user. The sensor electrodes may be mounted on top of the display screen or integrated into a layer or layers within the screen. The various display electrodes used by the display screen to update the image (e.g., source electrodes, gate electrodes, common electrodes, etc.), may capacitively couple to the sensor electrode. This coupling capacitance may cause the input device to measure the capacitance not associated with the input object when driving the capacitive sensing signal onto the electrode. This extra capacitance can consume system dynamic range and limit sensitivity to changes in capacitance due to the input object. This undesired extra capacitance can also change due to environmental factors such as image content or sensor temperature such that changes in the system background capacitance could be erroneously interpreted as changes from the input object and result in erroneous processing results.

Transmitting a guarding signal on display electrodes as well as on the sensor electrodes currently not being used to make a capacitive measurement may mitigate the effect of this coupling capacitance when measuring capacitance associated with a sensor electrode as well as reduce power consumption or improve settling time. In one embodiment, the guarding signal (or guard signal) may have similar characteristics (e.g., similar amplitude, frequency, or phase) as the capacitive sensing signal (modulated signal or transmitter signal). By driving a guarding signal that is similar to the capacitive sensing signal onto the display electrodes, the voltage difference between the sensor electrode and display electrodes remains the same. Accordingly, the coupling capacitance between the electrodes does not affect the capacitance measurement obtained during capacitive sensing. In one embodiment, the guarding signal has an amplitude that is greater than that of the capacitive sensing signal (transmitter signal or modulate signal). In another embodiment, the guarding signal has an amplitude that is less than that of the capacitive sensing signal (transmitter signal or modulated signal).

FIG. 1A is a schematic block diagram of an input device 100 integrated into an exemplary display device 160, in accordance with embodiments of the present technology. Although the illustrated embodiments of the present disclosure are shown integrated with a display device, it is contemplated that the invention may be embodied in input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1A, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1A.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing 120 for detecting user input. The input device 100 may include one or more sensing elements 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 120 to create electric fields. In some capacitive implementations, separate sensing elements 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1A, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 120 of the input device 100. In other embodiments, components of processing system 110 are physically separate with one or more components close to sensing element(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing elements 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1A shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Guarding Signals

Figure 1B:
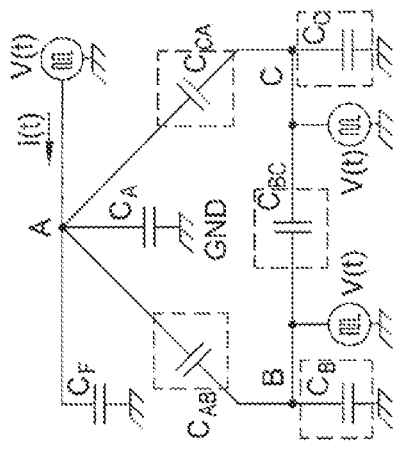
FIGS. 1B-1G illustrate various capacitances in input devices, according to embodiments described herein.

Absolute capacitive sensing may be performed by measuring the capacitance from a sensor electrode to substantially constant voltage (i.e., system ground or any other substantially constant voltage). FIGS. 1B-1G illustrate a network containing four nodes—A, B, C, and GND—that may be used when performing capacitive sensing. FIG. 1B, for instance, illustrates the various capacitances that may exist in a network containing these four nodes. As shown, there are six capacitances illustrated in this four-node network. Figure 1B (as it is driven by a modulated signal), any one of the nodes A, B or C may be used as a sensor electrode. In FIG. 1B, the sensor electrode (node A) has a capacitance, $C_F$, to GND, in parallel with $C_A$. The capacitance $C_F$ changes based on the proximity of an input object to the sensor electrode. Thus by measuring $C_F$, the position of the proximate input object may be determined. Throughout this description, node A and sensor electrode may be used interchangeably.

In one embodiment, the changed capacitance from a sensor electrode to a proximate input object is measured by driving a modulated signal (illustrated as V(t)) onto the sensor electrode and then measuring the resulting signals received with the sensor electrode. In one embodiment the resulting signals correspond to a resulting current, i(t). By measuring the resulting signals, the position of the input object may be determined. However, the capacitances $C_A$, $C_{AB}$, $C_{CA}$, $C_B$, $C_{BC}$ and/or $C_C$ shown in FIG. 1B may have several deleterious effects. For example, the total capacitance of the sensor electrode to ground is increased, increasing the settling time of the sensor electrode and the magnitude of the capacitances in the resulting signal is also increased which increases the required dynamic range of the sensing circuit. In various embodiments, some of the capacitances may be variable (due to process, temperature, applied DC voltage, etc.), making it difficult to compensate for the variation. In many embodiments, reducing or removing the other capacitances will improve performance of the input device and may make the change in capacitance between an input object and the sensor electrode more easily determined.

In one embodiment, and with further reference to FIG. 1B, the capacitance $C_F$ may be determined by driving node A, the sensor electrode, with a modulated signal and measuring a received resulting signal. During this drive and measurement phase, node B (i.e., another electrode) may be left floating, driven with a substantially constant voltage (e.g., ground, etc.) or driven with a guarding signal. Similarly, node C may be left floating, driven with a substantially constant voltage (ground) or driven with the guarding signal. Thus, there are nine possible combinations for nodes/electrodes B and C during the measurement as illustrated by Table 1 below.

TABLE 1

| Combination Number | Description | Node B | Node C |
|---|---|---|---|
| 1 | No Guarding, Electrodes Grounded | grounded | grounded |
| 2 | No Guarding, Floating Electrodes. | floated | floated |
| 3 | Guard by driving electrodes B and C with a guard signal | Guarded | Guarded |
| 4 | Drive electrode B with a guard signal and float electrode C | Guarded | floated |
| 5 | Drive electrode B with a guard signal and ground electrode C | Guarded | grounded |
| 6 | Ground electrode C and float electrode B. | floated | grounded |
| 7 | Guard Electrode C while Grounding Electrode B | grounded | Guarded |
| 8 | Guard Electrode C while Floating Electrode B | floated | Guarded |
| 9 | Ground Electrode B and Floating Electrode C | grounded | floated |

Reducing or eliminating the effects of the parasitic capacitances improves the settling time of the sensor electrode (node A in FIG. 1B) given the presence of parasitic resistances, which are not shown in FIGS. 1B-1G, allows more measurements per unit of time, and increases the signal to noise ratio. Some or all of capacitances $C_A$, $C_B$, $C_C$, $C_{AB}$, $C_{BC}$ and $C_{CA}$ may also vary as a function of temperature, process, applied voltage or other conditions. The mitigation of this variability is important in order to accurately detect changes in capacitance resulting from the input object.

In another embodiment of FIG. 1B, the measurement of $C_F$ may be improved by leaving nodes B and C open (electrically floating nodes B and C) during the measurement of $C_F$. If the values of $C_A$, $C_B$ and $C_C$ are small relative to the coupling capacitances $C_{BC}$ and $C_{CA}$ (e.g., an order of magnitude smaller), then guarding one node and floating the other becomes more effective. If the values of the capacitances from the nodes to ground are large relative to the coupling capacitances, however, then floating the node becomes less effective.

Figure 1D:
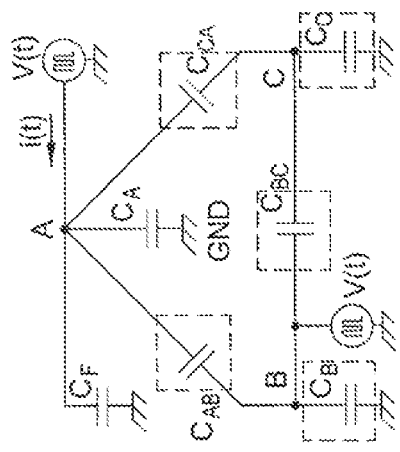
Figure 1C:
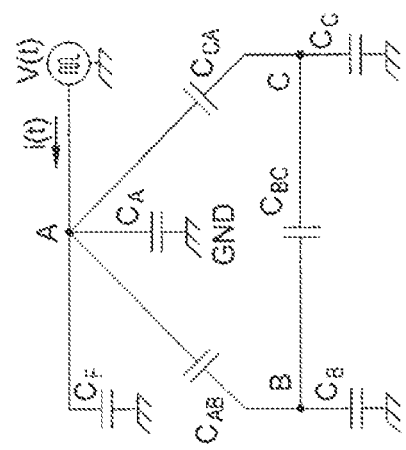

In the embodiment shown in FIG. 1C, the capacitance $C_F$ may be determined by grounding nodes B and C while driving node A with a modulated signal and measuring the resulting signal. Because nodes B and C are grounded, the capacitances $C_{AB}$ and $C_{CB}$ are effectively in parallel with the capacitance $C_F$ and $C_A$ while $C_B$, $C_{BC}$ and $C_C$ are effectively removed from the circuit (as shown by the dashed boxes). Capacitances $C_{AB}$ and $C_{CB}$ are typically large with respect to $C_F$, which increases the required dynamic range of the receiver module since $C_F$ along with $C_{AB}$ and $C_{CB}$ are all measured. Furthermore, because capacitances $C_{AB}$ and $C_{CB}$ are distributed capacitances along the resistive sensor electrode, the settling time of the sensor electrode is also increased.

Alternatively, as shown in FIG. 1D, nodes B and C (electrodes B and C) are both "guarded" by driving a guarding signal at the nodes shown by the two V(t) voltage generators. The guarding signal may be equal to the modulated signal V(t) in at least one of amplitude, shape, phase and/or frequency. In such embodiments, the voltages across all of the coupling capacitances $C_{AB}$, $C_{BC}$ and $C_{CA}$ shown in FIG. 1D that are connected to nodes B and C do not change, and thus, these capacitances are effectively removed from the circuit. The measured capacitance is the sum of $C_F$ with the single capacitance $C_A$. In many embodiments, $C_A$ is on the same order as $C_F$, and as such the dynamic range of the receiver module may not need to be increased and/or the settling time of the sensor electrode is only slightly increased due to $C_A$, allowing higher modulated signal or transmitter signal frequencies to be used. The guarding also has the important secondary benefit of removing the effects of changes in capacitors $C_{AB}$, $C_{BC}$ and $C_{CA}$ due to temperature, voltage, etc.

Figure 1E:
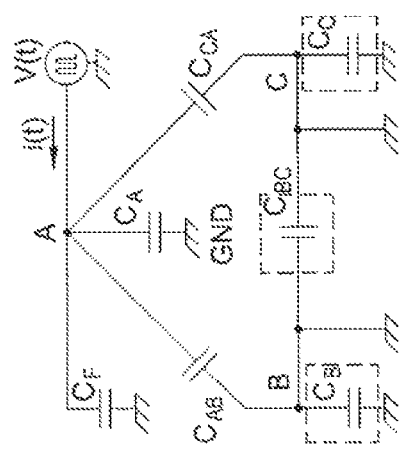

In some embodiments, as illustrated in FIG. 1E, a guarding signal is applied to one of node B and C while other node B or C is electrically floated. In this particular embodiment, the guarding signal is applied to node B as shown by shown by the V(t) voltage generator. The capacitance $C_C$ is assumed to be small compared to $C_{BC}$ and $C_{CA}$, thus node C is effectively driven by the guarding signal applied to node B. This effectively removes $C_{CA}$ from the circuit. Further, since a modulated signal and a guarding signal is applied to both ends of the series combination of $C_{BC}$ and $C_{CA}$, capacitors $C_{BC}$ and $C_{CA}$ may also be substantially eliminated from the equivalent circuit. Thus, when $C_C$ is small compared to $C_{BC}$ and $C_{CA}$, guarding only node/electrode B while floating node/electrode C may be substantially equivalent to guarding both nodes/electrodes B and C.

Figure 1G:
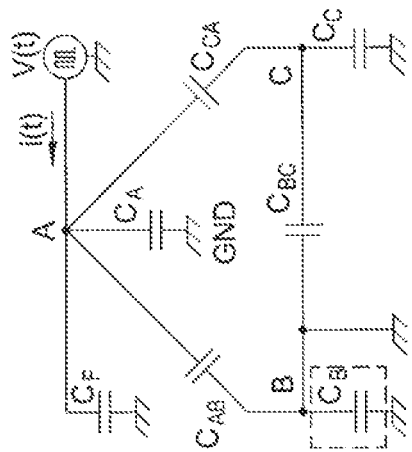
Figure 1F:
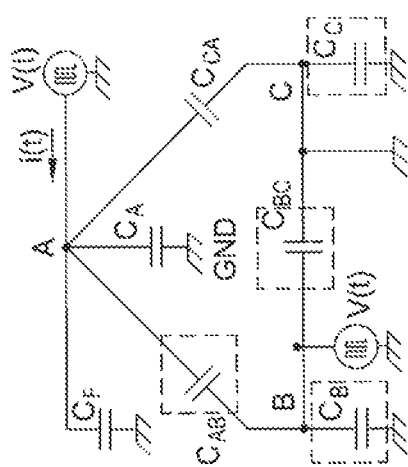

In the embodiment illustrated in FIG. 1F, a guard signal is driven onto node B or node C while the other one of node B or node C is driven with a substantially constant voltage (i.e., grounded). Because node B is driven, capacitance $C_B$ does not substantially affect the resulting signal, and since one end of $C_{BC}$ is driven and the other is grounded, $C_{BC}$ does not substantially affect the resulting signal. Further, since node C is grounded, capacitance $C_C$ does not substantially affect the resulting signal. Further, because both ends of $C_{AB}$ are driven in with a similar signal, it does not affect the resulting signal. However, since node C is driven with a substantially constant voltage and since node A is driven with the modulated signal, the capacitance between node C and node A ($C_{CA}$) may affect the resulting signal. This embodiment is different from FIGS. 1D and 1E in that, for example, the capacitance value between the nodes and ground (e.g., $C_C$) is removed while the coupling capacitance (e.g., $C_{CA}$) is not.

FIG. 1G illustrates an embodiment where one of node B and node C is grounded and the other one of the nodes is floated. In the illustrated embodiment, since node B is grounded, capacitance $C_B$ does not affect the resulting signal. Further, since $C_C$ and $C_{BC}$ are in parallel and $C_C$ is, in many embodiments, smaller than $C_{BC}$, $C_C$ may be ignored. This results in $C_{AB}$, $C_A$, and $C_{CA}$ in series with $C_{BC}$ which may affect the resulting signal.

In one embodiment of a display device, there are typically three electrodes that are shared by the pixels, for example: Vcom electrode (common electrode(s)), gate electrodes (gate lines) and source electrodes (source lines). As will be discussed in more detail below, in various embodiments, any of these electrodes may be configured as a sensor electrode. In one embodiment, the four node network described in FIGS. 1B-1G may correspond to a single sub-pixel; however, a similar discussion may be extended to an aggregated group of sub-pixels. For example, node A may be a sensor electrode that is also used in updating a display. Nodes B and C may be other types of display electrodes (e.g., gate and source electrodes). Further, the capacitances associated with a sensor electrode may also include the capacitances of the associated wiring or other routing. The capacitances associated with a sub-pixel may include a network containing the four nodes: AC system ground (also referred to as "GND" and shown by the symbol ⏚ in the various figures), Vcom electrodes, source electrodes and gate electrodes.

In one embodiment, each of the sensor electrodes comprise one or more segments of the common electrode layer (Vcom electrode segments), source lines and gate lines, where a sensor electrode corresponds to node A and the source lines correspond to node B and the gate lines correspond to node C in the above discussion. The source lines and/or gate lines may be driven with a guarding signal or electrically floated to at least partially remove their parasitic capacitance effects. Further, common electrodes may also be driven with guarding signal so that their capacitances will not affect the sensor electrode that is being driven for capacitive sensing. In contrast, typical display devices may drive a DC voltage on the source and gate lines during the touch measurement interval as shown in, for example, FIG. 1C where node B and node C are grounded. In contrast, FIGS. 1D-1F illustrate driving guarding signals onto at least one of the display electrodes in order to remove one or more of the coupling capacitances.

In another embodiment, the sensor electrodes are separate from the Vcom electrode(s) (common electrodes), where the Vcom electrode is driven with a guarding signal to reduce the effects of the parasitic capacitive coupling between the Vcom electrode and the sensor electrodes. Further, all of the gate lines and/or source lines may also be driven with a guarding signal or electrically floated to reduce the parasitic capacitance effects between the gate lines and the sensor electrodes and the source lines and sensor electrodes.

In a further embodiment, a first sensor electrode may be driven with a transmitter signal while a resulting signal comprising effects corresponding to the transmitter signal is received with a second sensor electrode. Similar schemes as described above may be applied to display electrodes proximate the first sensor electrode and/or second sensor electrode. By, reducing or eliminating the capacitances to ground from the transmitter electrode (first sensor electrode) and the receiver electrode (second sensor electrode) the settling time of the transmitter electrode and/or receiver electrodes may be improved. Further, any variations in the capacitance values between the transmitter and receiver electrodes based on the variations in the capacitances between the transmitter and/or receiver electrodes and the display electrodes may be reduced or eliminated.

The above discussion may be further applied to the various configurations embodied in the forthcoming description.

Sensor Electrode Arrangements

In one embodiment, the sensor electrodes 120 may be arranged on different sides of the same substrate. For example, each of the sensor electrode(s) 120 may extend longitudinally across one of the surfaces of the substrate. Further still, on one side of the substrate, the sensor electrodes 120 may extend in a first direction, but on the other side of the substrate, the sensor electrodes 120 may extend in a second direction that is either parallel with, or perpendicular to, the first direction. For example, the electrodes 120 may be shaped as bars or stripes where the electrodes 120 on one side of the substrate extend in a direction perpendicular to the sensor electrodes 120 on the opposite side of the substrate.

The sensor electrodes may be formed into any desired shape on the sides of the substrate. Moreover, the size and/or shape of the sensor electrodes 120 on one side of the substrate may be different than the size and/or size of the electrodes 120 on another side of the substrate. Additionally, the sensor electrodes 120 on the same side may have different shapes and sizes.

In another embodiment, the sensor electrodes 120 may be formed on different substrates that are then laminated together. In one example, a first plurality of the sensor electrodes 120 disposed on one of the substrate may be used to transmit a sensing signal (i.e., transmitter electrodes) while a second plurality of the sensor electrodes 120 disposed on the other substrate are used to receive resulting signals (i.e., receiver electrodes). In other embodiments, the first and/or second plurality of sensor electrodes may be driven as absolute capacitive sensor electrodes. In one embodiment, the first plurality of sensor electrodes may be larger (larger surface area) than the second plurality of sensor electrodes, although this is not a requirement. In other embodiments, the first plurality and second plurality of sensor electrodes may have a similar size and/or shape. Thus, the size and/or shape of the sensor electrodes 120 on one of the substrates may be different than the size and/or size of the electrodes 120 on the other substrate. Nonetheless, the sensor electrodes 120 may be formed into any desired shape on their respective substrates. Additionally, the sensor electrodes 120 on the same substrate may have different shapes and sizes.

In another embodiment, the sensor electrodes 120 are all located on the same side or surface of a common substrate. In one example, a first plurality of the sensor electrodes comprise jumpers in regions where the first plurality of sensor electrodes crossover the second plurality of sensor electrodes, where the jumpers are insulated from the second plurality of sensor electrodes. As above, the sensor electrodes 120 may each have the same size or shape or differing size and shapes.

In another embodiment, the sensor electrodes 120 are all located on the same side or surface of the common substrate are isolated from each other in the sensing region 170. In such embodiments, the sensor electrodes 120 are electrically isolated from each other. In one embodiment, the electrodes 120 are disposed in a matrix array where each sensor electrode 120 is substantially the same size and/or shape. In such embodiment, the sensor electrodes 120 may be referred to as a matrix sensor electrode. In one embodiment, one or more of sensor electrodes of the matrix array of sensor electrodes 120 may vary in at least one of size and shape. Each sensor electrode of the matrix array may correspond to a pixel of the capacitive image. In one embodiment, the processing system 110 is configured to drive the sensor electrodes 120 with a modulated signal to determine changes in absolute capacitance. In other embodiment, processing system 110 is configured to drive a transmitter signal onto a first one of the sensor electrodes 120 and receive a resulting signal with a second one of the sensor electrodes 120. The transmitter signal(s) and modulated signal(s) may be similar in at least one of shape, amplitude, frequency and phase. In various embodiments, the transmitter signal(s) and modulated signal(s) are the same signal. Further, the transmitter signal is a modulated signal that is used to for transcapacitive sensing. In various embodiments, one or more grid electrodes may be disposed on the common substrate, between the sensor electrodes 120 where the grid electrode(s) may be used to shield and guard the sensor electrodes.

As used herein, shielding refers to driving a constant voltage onto an electrode and guarding refers to driving a varying voltage signal onto a second electrode that is substantially similar in amplitude and phase to the signal modulating the first electrode in order to measure the capacitance of the first electrode. Electrically floating an electrode can be interpreted as a form of guarding in cases where, by floating, the second electrode receives the desired guarding waveform via capacitive coupling from the first or third electrode in the input device 100. In various embodiments, guarding may be considered to be a subset of shielding such that guarding a sensor electrode would also shield that sensor electrode. The grid electrode may be driven with a varying voltage, a substantially constant voltage or be electrically floated. The grid electrode may also be used as a transmitter electrode when it is driven with a transmitter signal such that the capacitive coupling between the grid electrode and one or more sensor electrodes may be determined. In one embodiment, a floating electrode may be disposed between the grid electrode and the sensor electrodes. In one particular embodiment, the floating electrode, the grid electrode and the sensor electrode comprise the entirety of a common electrode of a display device. In other embodiments, the grid electrode may be disposed on a separate substrate or surface of a substrate than the sensor electrodes 120 or both. Although the sensor electrodes 120 may be electrically isolated on the substrate, the electrodes may be coupled together outside of the sensing region 170—e.g., in a connection region that transmits or receives capacitive sensing signals on the sensor electrodes 120. In various embodiments, the sensor electrodes 120 may be disposed in an array using various patterns where the electrodes 120 are not all the same size and shape. Furthermore, the distance between the electrodes 120 in the array may not be equidistant.

In any of the sensor electrode arrangements discussed above, the sensor electrodes 120 and/or grid electrode(s) may be formed on a substrate that is external to the display device 160. For example, the electrodes 120 and/or grid electrode(s) may be disposed on the outer surface of a lens in the input device 100. In other embodiments, the sensor electrodes 120 and/or grid electrode(s) are disposed between the color filter glass of the display device and the lens of the input device. In other embodiments, at least a portion of the sensor electrodes and/or grid electrode(s) may be disposed such that they are between a Thin Film Transistor substrate (TFT substrate) and the color filter glass of the display device 160. In one embodiment, a first plurality of sensor electrodes and/or grid electrode(s) are disposed between the TFT substrate and color filter glass of the display device 160 and the second plurality of sensor electrodes and/or a second grid electrode(s) are disposed between the color filter glass and the lens of the input device 100. In yet other embodiments, all of sensor electrodes 120 and/or grid electrode(s) are disposed between the TFT substrate and color filter glass of the display device, where the sensor electrodes may be disposed on the same substrate or on different substrates as described above.

In one or more embodiment, at least a first plurality the sensor electrodes 120 comprised one or more display electrodes of the display device that are used in updating the display. For example, the sensor electrodes 120 may comprise the common electrodes such as one or more segments of a Vcom electrode, a source drive line, gate line, an anode sub-pixel electrode or cathode pixel electrode, or any other display element. These common electrodes may be disposed on an appropriate display screen substrate. For example, the common electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the common electrode can also be referred to as a "combination electrode", since it performs multiple functions. In various embodiments, each of the sensor electrodes 120 comprises one or more common electrodes associated with a pixel or sub pixel. In other embodiments, at least two sensor electrodes 120 may share at least one common electrode associated with a pixel or sub-pixel. While the first plurality sensor electrodes may comprise one or more common electrodes configured for display updating and capacitive sensing, the second plurality of sensor electrodes may be configured for capacitive sensing and not for display updating. Further, in one or more embodiments, the grid electrode and/or floating electrode, when present, comprises one or more common electrodes.

Alternatively, all of the sensor electrodes 120 may be disposed between the TFT substrate and the color filter glass of the display device 160. In one embodiment, a first plurality of sensor electrodes are disposed on the TFT substrate, each comprising one or more common electrodes and a second plurality of sensor electrodes may be disposed between the color filter glass and the TFT substrate. Specifically, the receiver electrodes may be routed within the black mask on the color filter glass. In another embodiment, all of the sensor electrodes 120 comprise one or more common electrodes. The sensor electrodes 120 may be located entirely on the TFT substrate or the color filter glass as an array of electrodes. As discussed above, some of the sensor electrodes 120 may be coupled together in the array using jumper or all the electrodes 120 may be electrically isolated in the array and use grid electrodes to shield or guard the sensor electrodes 120. In one more embodiments, the grid electrode, when present, comprises one or more common electrodes.

In any of the sensor electrode arrangements described above, the sensor electrodes 120 may be operated in the input device 100 in the transcapacitive mode by dividing the sensor electrodes 120 into transmitter and receiver electrodes or in the absolute capacitive sensing mode, or some mixture of both.

As will be discussed in more detail below, one or more of the sensor electrodes 120 or the display electrodes (e.g., source, gate, or reference (common) lines) may be used to perform shielding or guarding. As used herein, shielding refers to driving a constant voltage or a guard signal (varying voltage signal) onto an electrode as well as floating an electrode in the input device 100.

Continuing to refer to FIG. 1A, the processing system 110 coupled to the sensor electrodes 120 includes a sensor module and in various embodiments, processing system 110 may also or alternatively comprise a display driver module. The sensor module includes circuitry configured to drive at least one of the sensor electrodes 120 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing and may also be referred to as a capacitive sensing signal. In various embodiments, the modulated signal and transmitter signal are similar in at least one shape, frequency, amplitude and/or phase. In other embodiments, the modulated signal and the transmitter signals are different in frequency, shape, phase, amplitude and phase. The sensor module may be selectively coupled to one or more of the sensor electrodes 120. For example, the sensor module 204 may be coupled to at least one of the sensor electrodes 120 and operate in either an absolute or transcapacitive sensing mode.

The sensor module includes circuitry configured to receive resulting signals with the sensor electrodes 120 comprising effects corresponding to the modulated signals or the transmitter signals during periods in which input sensing is desired. The sensor module may determine a position of the input object 140 in the sensing region or may provide a signal including information indicative of the resulting signal to another module or processor, for example, determination module or a processor of the electronic device (i.e., a host processor), for determining the position of the input object 140 in the sensing region.

The display driver module includes circuitry configured to provide display image update information to the display of the display device 160 during display updating periods. In one embodiment, the display driver is coupled to the display electrodes (source electrodes, gate electrodes and Vcom electrodes) configured to drive at least one display electrode to set a voltage associated with a pixel of a display device, and operate the at least one display electrode in a guard mode to mitigate the effect of the coupling capacitance between a first sensor electrode of a plurality of sensor electrodes and the at least one display electrode. In various embodiments, the display electrode is at least one of a source electrode that drives a voltage onto a storage element associated with the pixel, a gate electrode that sets a gate voltage on a transistor associated with the pixel, and a common electrode that provides a reference voltage to the storage element.

In one embodiment, the sensor module and display driver module may be comprised within a common integrated circuit (first controller). In another embodiment, the sensor module and display driver module are comprised in two separate integrated circuits. In those embodiments comprising multiple integrated circuits, a synchronization mechanism may be coupled between them, configured to synchronize display updating periods, sensing periods, transmitter signals, display update signals and the like.

Guarding Display Electrodes

FIGS. 2A-2E are circuit diagrams illustrating circuits for measuring capacitance, according to embodiments described herein. Specifically, FIGS. 2A-2E may represent the circuit model of the input device 100 in FIG. 1A when performing absolute capacitance sensing as described above. Although the present embodiments discuss using a guarding signal in the context of absolute capacitance sensing, the disclosure is not limited to such. Instead, during transcapacitance sensing, the guarding signal (i.e., a similar signal as the transmitter signal) may be transmitted on the display electrodes described below that are not used during capacitive sensing. Doing so may reduce power consumption and improve settling time.

Figure 2A:
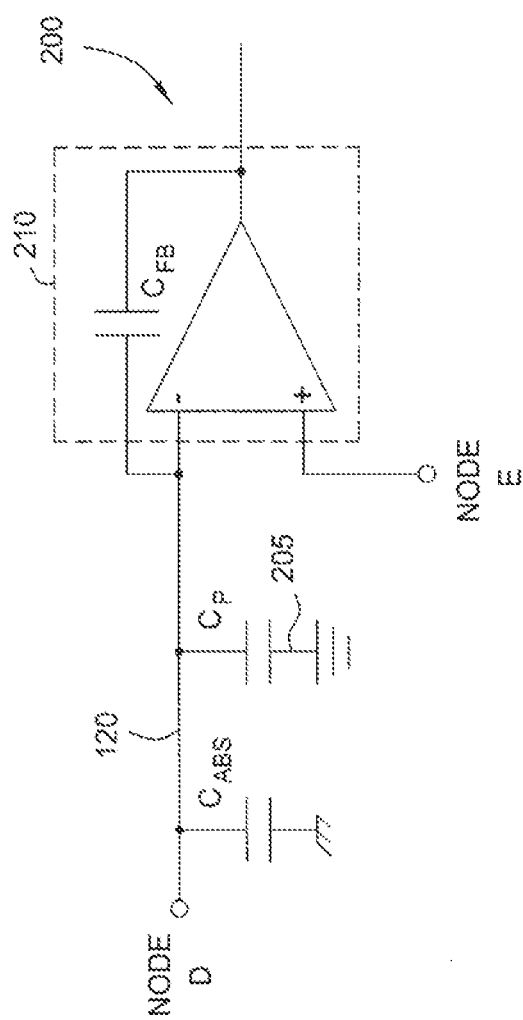
FIGS. 2A-2F illustrate circuit models for measuring capacitance, according to embodiments described herein.

As shown by diagram 200 in FIG. 2A, at node D, a sensing voltage is coupled to one or more of the sensor electrode 120. Diagram 200 includes an integrator 210 comprising an op amp with a feedback capacitor ($C_{FB}$). The integrator 210 measures the capacitance between the sensor electrode 120 and free space (or earth ground) which is represented by the capacitor $C_{ABS}$ in FIG. 2A. This capacitance changes as the input object comes within proximity of the sensing area in the input device. In one embodiment, at node E a modulated signal may switch between a low voltage and a high voltage. As the voltage at node E changes, the integrator drives the negative terminal to the same voltage. Based on the output voltage of the integrator 210, the input device can determine how much charge had to flow in order to charge the capacitances $C_{ABS}$ and $C_P$, and thus, determine the value of these capacitances. In other embodiments, the modulated voltage may instead be applied at the node E in order to measure $C_{ABS}$. Further still, instead of driving a voltage in order to measure a current to determine the value of $C_{ABS}$ as shown in FIGS. 2A-2F, alternatively the input device could drive a current and measure a voltage. Regardless of the specific technique used to measure $C_{ABS}$, guarding the sensor and/or display electrodes as described below may improve performance.

Figure 2B:
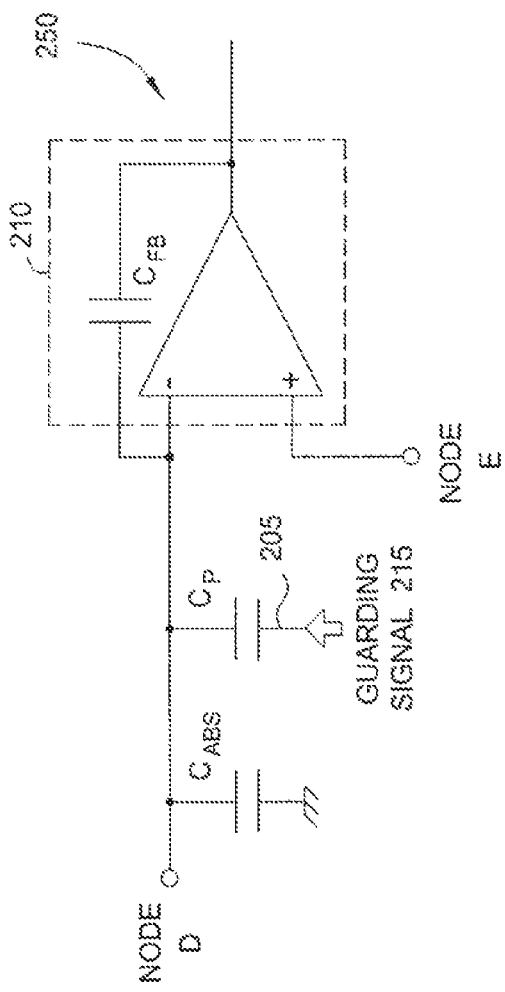

Diagram 200 also illustrates that a parasitic capacitance $C_P$ may affect the measurement obtained by the integrator 210. As is described above in relation to FIGS. 1B-1G, because the parasitic capacitance may be much larger than changes in capacitance $C_{ABS}$, the integrator 210 may be unable to effectively identify the changes in capacitance $C_{ABS}$ without utilizing techniques to address high parasitic capacitance $C_P$. Diagram 250 in FIG. 2B illustrates a circuit model where a guarding signal 215 is applied that enables the integrator 210 to effectively identify the change in capacitance $C_{ABS}$ even in the presence of high parasitic capacitance $C_P$.

In diagram 250, and as described above, the parasitic capacitance $C_P$ represents the coupling capacitance between a sensor electrode 120 and any electrode 205 in the input device. As such, electrode 205 may be another sensor electrode that is currently not being sensed or a display electrode that is proximate to electrode 120—e.g., a source, Vcom, cathode, or gate electrode used to update a display image in the input device. In order to prevent parasitic capacitance between electrode 205 and sensor electrode 120 from interfering with the absolute capacitance measurement taken by integrator 210, a guarding signal may be directly or indirectly applied to the electrode 205. Specifically, the guarding signal may be the same or substantially similar to the modulating signal driven on electrode 120. Thus, if the voltage across the parasitic capacitance does not change (i.e., if the voltage on one side of the capacitance $C_P$ changes by the same amount as the voltage on the other side) then the capacitance $C_P$ does not affect the measurement taken by the integrator 210. For example, if at node E the modulating signal is defined by switching between low and high sensing voltages, the same voltage change may be applied to the electrode 205 as a guarding signal.

In one embodiment node D or node E may be electrically coupled to electrode 205 so that the same modulated signal driven on electrode 120 is driven as a guarding signal on electrode 205 but this is not a requirement. For example, other driving circuits, which are synchronized, may be used to drive a guarding signal onto electrode 205 that is substantially similar (i.e., same phase and/or frequency and/or amplitude) to the modulated signal driven on electrode 120.

Figure 2C:
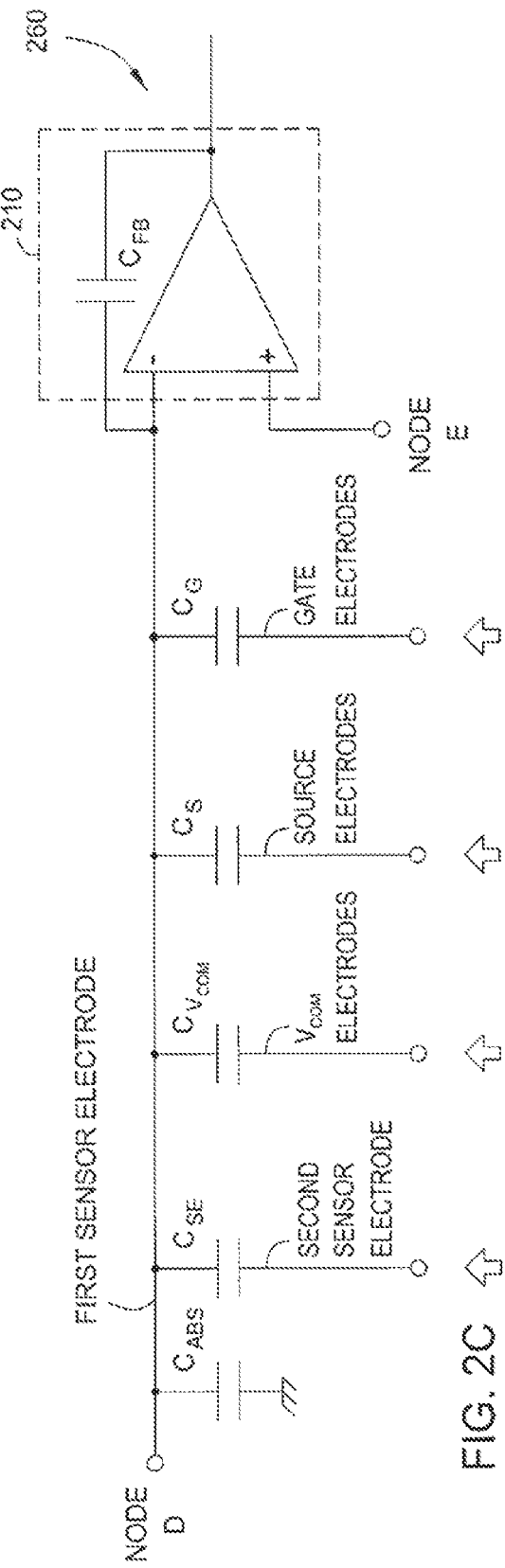

FIG. 2C illustrates a diagram 260 where the sensor electrodes are separate from the display electrodes (e.g., source, gate, or Vcom (or cathode) electrodes). Because of the close proximity between the electrodes, there may exist parasitic capacitance between the sensor electrodes (shown as first sensor electrode in FIG. 2C) and the other electrodes in the input device. Stated differently, the parasitic capacitance in FIG. 2C is the combination of the coupling capacitance between a first sensor electrode and a second sensor electrode ($C_{SE}$), the Vcom electrodes ($C_{VCOM}$), the source electrodes ($C_S$), and the gate electrodes ($C_G$). In order to mitigate the effect of these parasitic capacitances when measuring the absolute capacitance, the electrodes are directly or indirectly driven with one or more guarding signals.

In one embodiment, the first sensor electrode may be one or more of a plurality of receiver electrodes and the second sensor electrode may one or more of a plurality of transmitter electrodes. In other embodiments, the first and second sensor electrode is a first and second sensor electrode of a common plurality of sensor electrodes (e.g., transmitter electrodes, receiver electrodes, or matrix sensor electrodes). In another embodiment, the first sensor electrode may be one or more of a plurality of transmitter electrodes and the second sensor electrode may be one or more of a plurality of receiver electrodes. In a further embodiment, the first sensor electrode is one type of a matrix sensor electrode and the second sensor electrode is the same type of matrix sensor electrode. In yet a further embodiment, the first sensor electrode is one or more of a plurality of matrix sensor electrodes while the second sensor electrode is one or more grid electrodes. Further, the first sensor electrode is one type of matrix sensor electrode while the second sensor electrode is a second, different type of matrix sensor electrode. While not illustrated in FIG. 2C, one of the second sensor electrode, the $V_{com}$ electrodes, source electrodes and gate electrodes may be further capacitively coupled to a another sensor electrode and which may add to the parasitic capacitance of the sensor electrode.

Figure 2D:
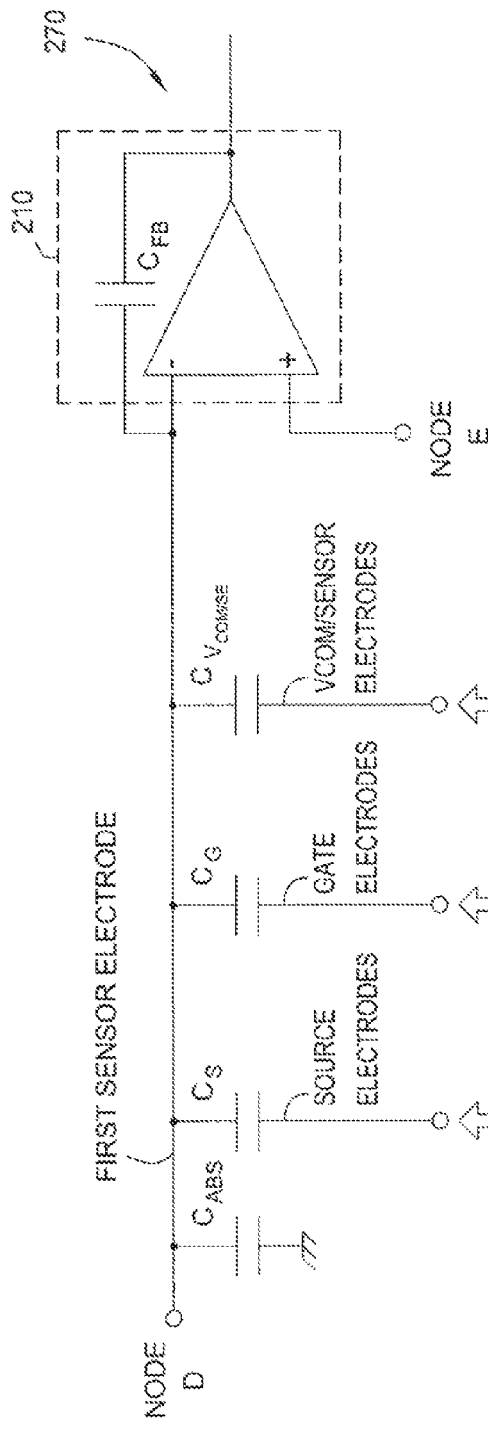

FIG. 2D illustrates a diagram 270 where a second sensor electrode of the sensor electrodes comprises one or more common electrodes of the display device which are used for display updating (shown here as Vcom/sensor electrode) and input sensor and first sensor electrode which is not used for updating the display device. As illustrated, the first sensor electrode is capacitively coupled to the Vcom/sensor electrode, source electrode, and gate electrode of the display device. Thus, as the modulated signal is driven on the first sensor electrode, guarding signal(s) may also be driven onto the Vcom/sensor electrodes, source, and gate electrodes thereby mitigating the effects of the parasitic capacitance when measuring the absolute capacitance $C_{ABS}$. While not illustrated in FIG. 2D another parasitic capacitance may exist between the first sensor electrode and a second sensor electrode where the first and second sensor electrodes may be of a common plurality of sensor electrodes or between the first sensor electrode and a grid electrode. Further, one of the second sensor electrodes, the $V_{com}$ electrodes, source electrodes and gate electrodes may be further capacitively coupled to another sensor electrode and which may add to the parasitic capacitance of the sensor electrode.

In one embodiment, the input device may also measure the absolute capacitance between the second sensor electrode (Vcom/sensor electrode) and earth ground. In this case, the modulated signal is driven on the second sensor electrode while a guarding signal may be driven onto the first sensor electrode. Stated differently, instead of driving the modulated signal onto all the sensor electrodes simultaneously, the circuit performs absolute capacitive sensing on only the second sensor electrode while driving the guarding signal on the first sensor electrode during one sensing cycle but then reverses during a subsequent sensing cycle and measures the absolute capacitance associated with the first sensor electrode while transmitting the guarding signal on the second sensor electrode.

Figure 2E:
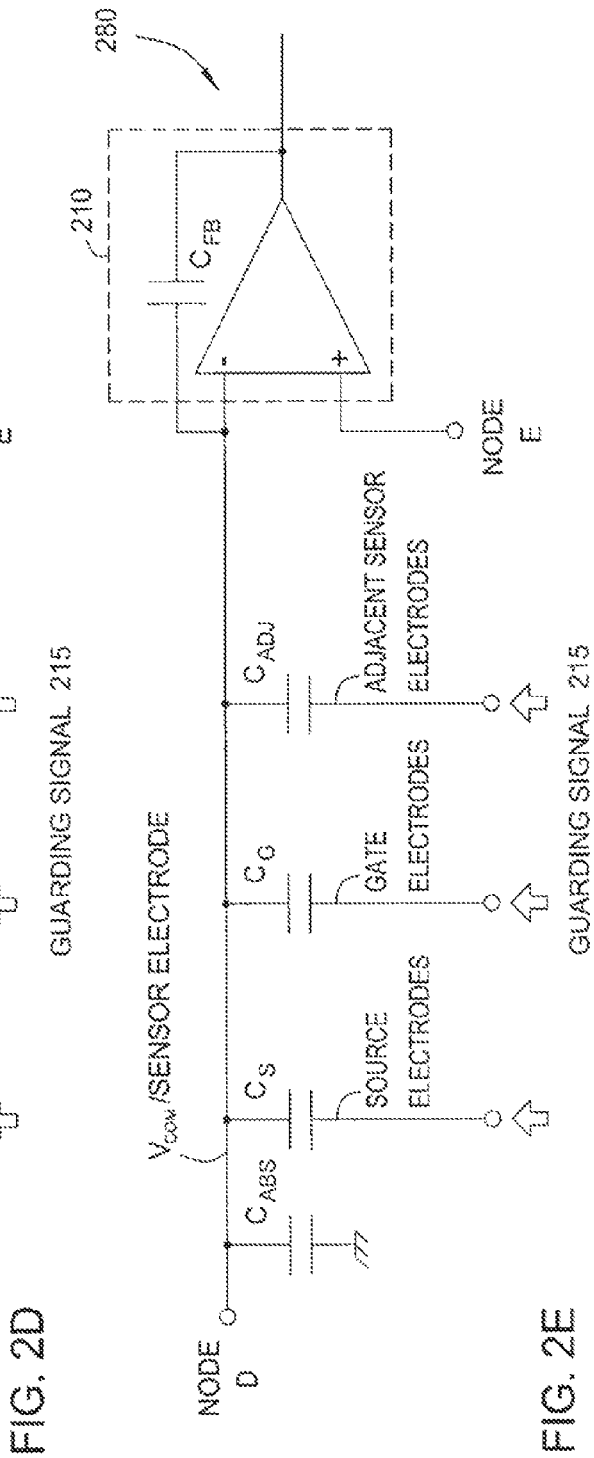

FIG. 2E illustrates a circuit 380 where all of the sensor electrodes comprise one or more common electrodes of the display device. However, in other embodiments, the sensors electrodes may be the source or gate electrodes. For example, the sensor electrodes may be located on the same substrate (or surface) as an array of electrodes or distributed across multiple surfaces in the display device. The parasitic capacitance between the first sensor electrodes (i.e., common electrodes or Vcom/sensor electrodes) may include the coupling capacitance between the common electrodes and the source, gate, and adjacent sensor electrodes that are not driven in the same manner as the first sensor electrode. To ensure that the voltage across these parasitic capacitances does not change, the guarding signal may be directly or indirectly driven onto source, gate, and adjacent electrodes. The adjacent sensor electrodes may comprise a grid electrode or a second sensor electrode. Additionally, the parasitic capacitances between the sensor electrode and additional adjacent sensor electrodes may also exist, where the first adjacent sensor electrode may be another sensor electrode and the second adjacent sensor electrode may be a grid electrode. Further, one of the adjacent sensor electrodes, source electrodes and gate electrodes may be further capacitively coupled to another sensor electrode and which may affect the parasitic capacitance of the sensor electrode.

Figure 2F:
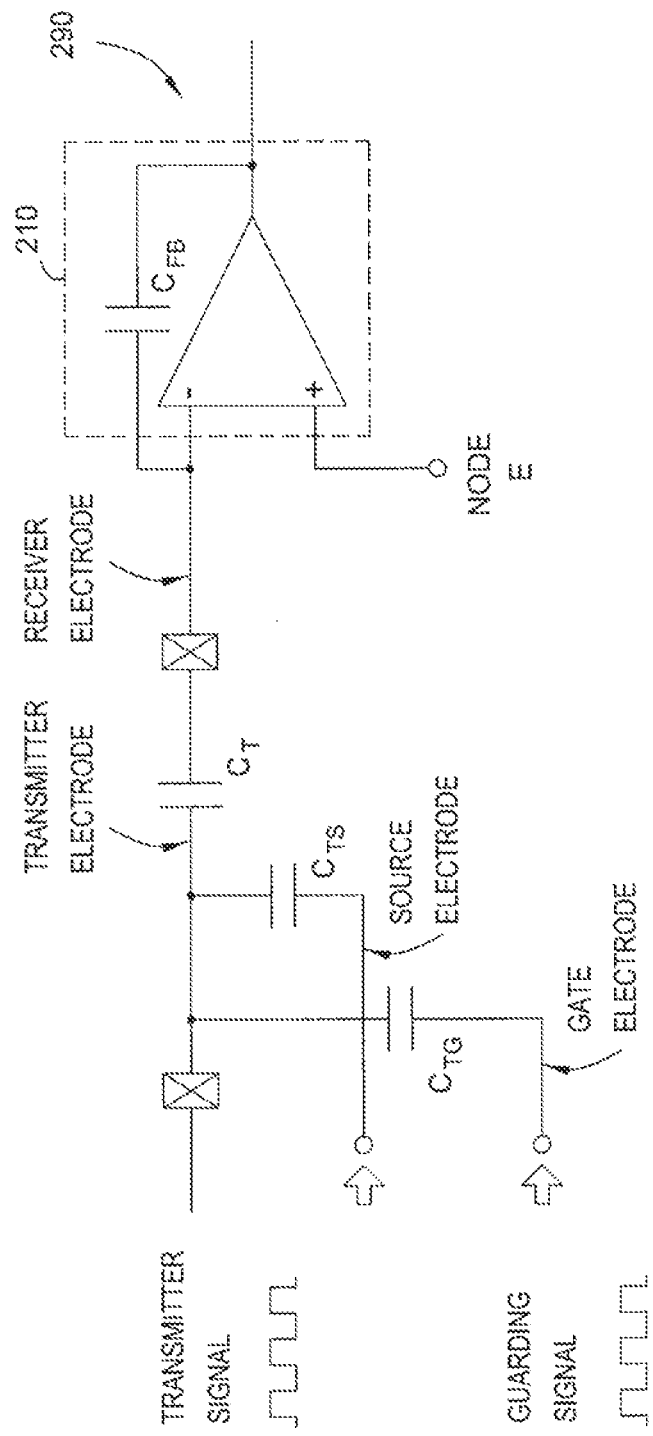

In a further embodiment, as illustrated in FIG. 2F, a first sensor electrode (transmitter electrode) may be driven with a transmitter signal while a resulting signal comprising effects corresponding to the transmitter signal is received with a second sensor electrode (receiver electrode). In circuit 290, the transmitter electrode comprises at least one common electrode. Further, the receiver electrode may comprise at least one common electrode but in various embodiments, the receiver electrode may be separate from the common electrodes. By, reducing or eliminating the capacitances from the transmitter electrode (first sensor electrode) to the source/gate electrodes, the settling time of the transmitter electrode may be improved. As shown, the source electrodes and/or gate electrodes may be driven with a guarding signal such that the parasitic capacitances $C_{TS}$ and $C_{TG}$ between the transmitter electrode and the source electrodes and/or gate electrodes is reduced or eliminated. While not illustrated in FIG. 2F, an additional parasitic capacitance may exist between the receiver electrode and Vcom electrodes when the transmitter electrodes are separate from the Vcom electrodes.

Although FIGS. 2C-2F illustrate driving the same guarding signal across the various display and sensor electrodes, this is for ease of explanation. In other embodiments, the DC voltages across the display and sensor electrodes may be unique. Thus, driving the guarding signal onto the electrodes only changes the DC voltages in the electrodes in the same manner but does not make them equivalent voltages. For example, the guarding signal may raise each voltage on the source, gate, and Vcom electrodes by 4 V but the resulting voltage on the electrodes may be different—e.g., −1 V, 3 V, and 5V, respectively. Thus, mitigating the effect of the parasitic capacitances is not dependent on the absolute voltage of the various electrodes but rather that the voltage across the parasitic capacitances remains substantially unchanged.

Additionally, the guarding signal may be transferred between the different electrodes using capacitive coupling. For example, Vcom and gate electrodes may be located on neighboring layers in the display device. As such, the guarding signal may be driven onto only one set of these electrodes and rely on the capacitive coupling between the electrodes to propagate the guarding signal on both sets of electrodes.

Further, in any of the embodiments of FIGS. 2B-2F, one of the display and sensor electrodes that contribute to the parasitic capacitive coupling may be driven with a substantially constant signal, while the other electrodes are driven with a guarding signal as is described in FIGS. 1B-1G. Further yet, in any of the embodiments of FIGS. 2B-2F, at least one of the display and sensor electrodes that contribute to the parasitic capacitive coupling may be electrically floated while the other electrodes are driven with a guarding signal or is electrically floated as is described in FIGS. 1B-1G.

Figure 3A:
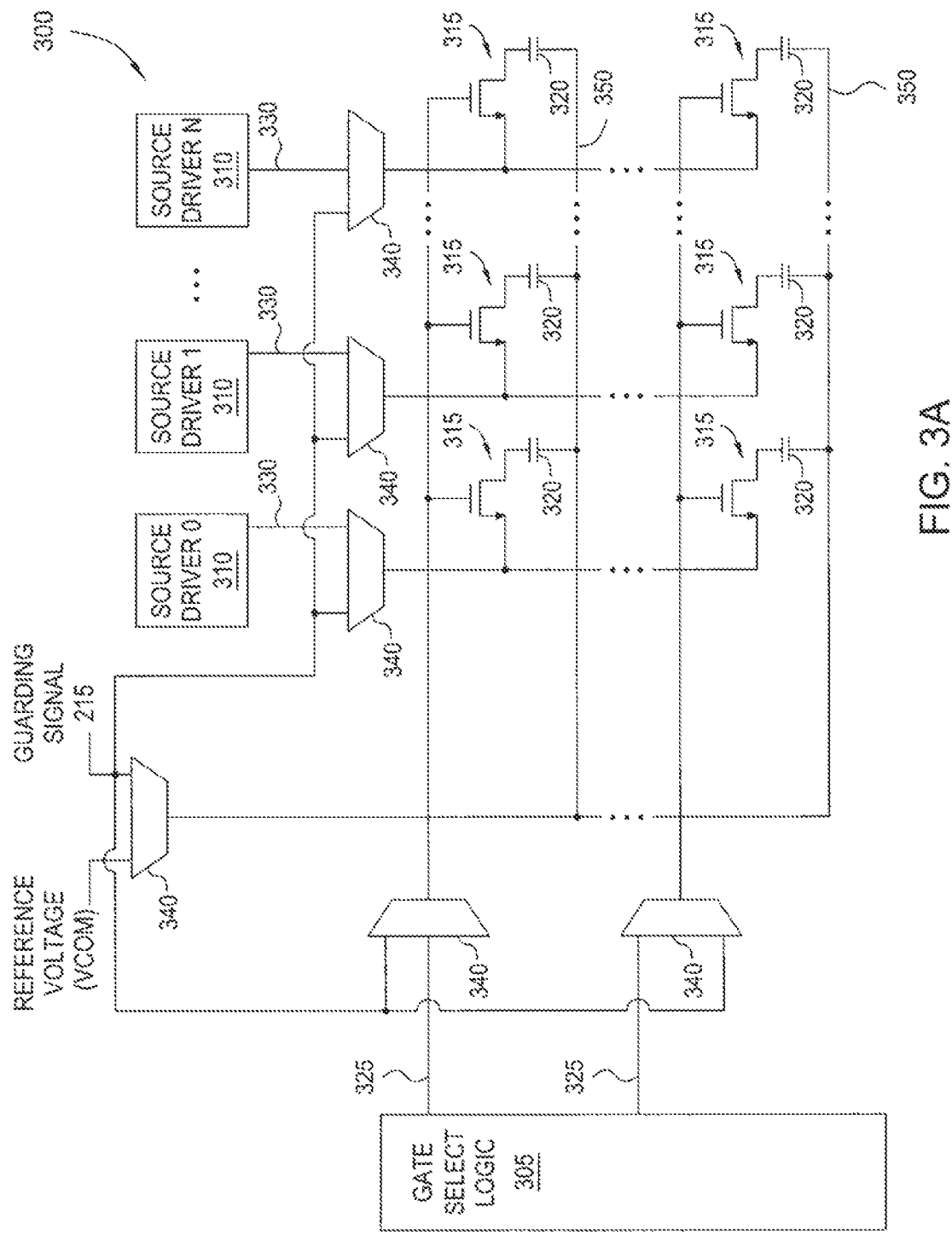
FIGS. 3A-3B are schematic block diagrams of a display system for guarding display electrodes during capacitive sensing, according to an embodiment described herein.
Figure 3B:
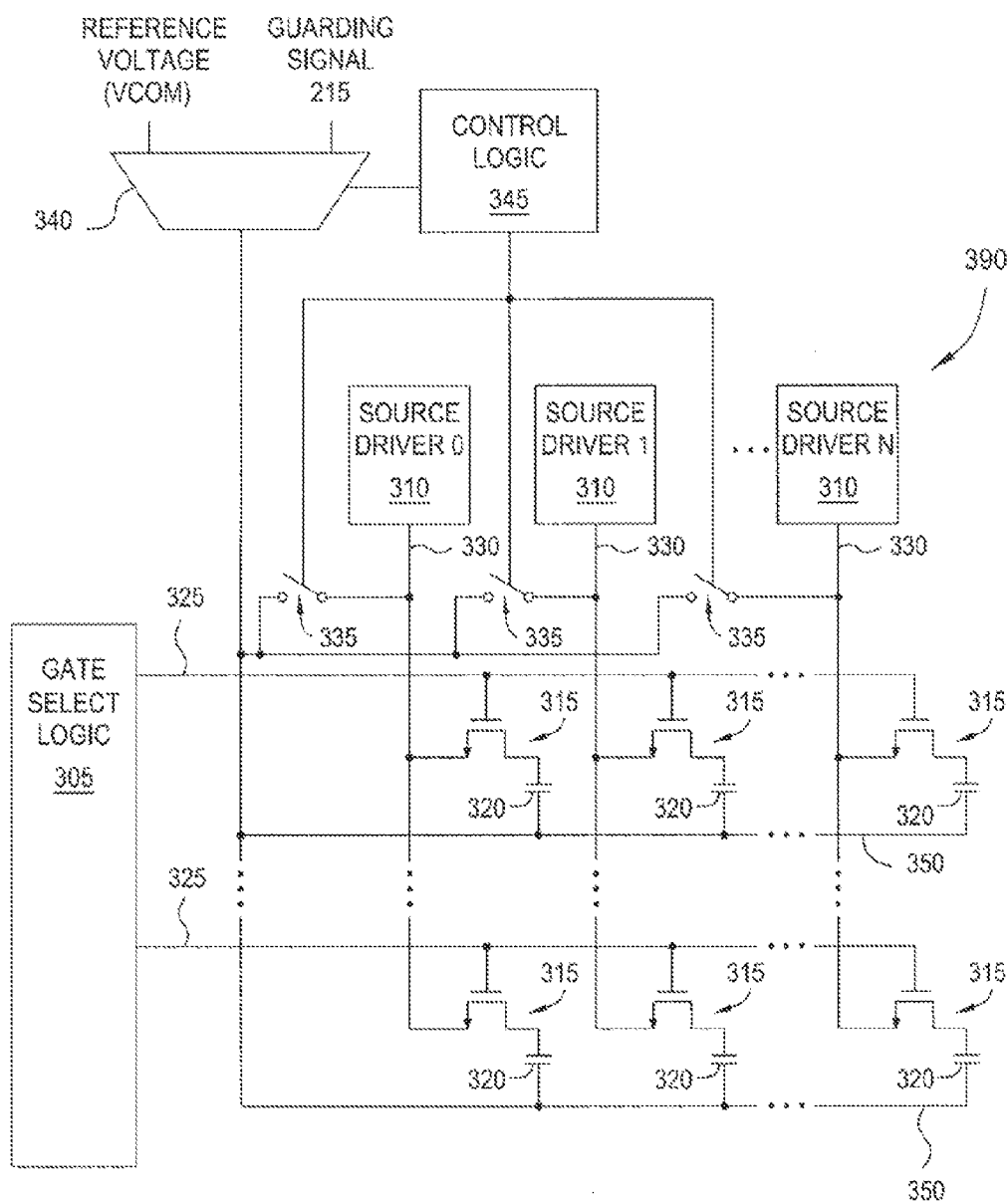

FIGS. 3A-3B are schematic block diagrams of display systems for guarding display electrodes during capacitive sensing, according to an embodiment described herein. Specifically, the display system 300 includes gate select logic 305 and a plurality of source drivers 310 coupled to pixels 315. For example, system 300 may be part of a display device in input device 100 discussed in FIG. 1A. The gate select logic 305 (also referred to as row selection logic) may select one of the gate electrodes 325 (or rows) by activating the respective transistor switches in pixels 315. When on, these switches enable a conductive path through which source drivers 310 may drive a desired voltage across the capacitors 320. The voltage on the capacitors 320 is defined by the voltage difference between the voltage on the source electrodes 330 (or column lines) connected to source driver 310 and the reference voltage (e.g., Vcom) on the common electrodes 350. In one embodiment, the capacitance of capacitors 320 may be based on, at least in part, the liquid crystal material used to set the color associated with pixels 315. However, the embodiments described herein are not limited to any particular display technology and may be used, for example, with LED, OLED, CRT, plasma, EL, or other display technology.

The gate select logic 305 may raster through the individual rows of the display screen until all the pixels have been updated (referred to herein as a display frame update). For example, gate select logic 305 may activate a single gate electrode 325 or row. In response, the source drivers 310 may drive respective voltages onto the source electrodes 330 that generate a desired voltage (relative to the reference voltage) across the capacitors 320 in the activated row. The gate select logic 305 may then de-activate this row before activating a subsequent row. In this manner, the gate select logic 305 and the source drivers 310 may be controlled by, for example, a display driver module on the processing system such that source drivers 310 provide the correct voltage for the pixels 315 as the gate select logic 305 activates each row.

When performing capacitive sensing, or more specifically, when performing absolute capacitance sensing, the gate, source, and common electrodes 325, 330, 350 may transmit the guarding signal. System 300 includes multiplexers 340 (i.e., muxes) that may be used to transmit the guarding signal on the display electrodes. For example, when performing capacitive sensing, the display device may switch the select signal controlling the muxes 340 such that the guarding signal is transmitted on the display electrodes—i.e., gate, source, and common (or cathode) electrodes 325, 330, 350. Although circuit 300 illustrates transmitting the guarding signal on all the display electrodes, in other embodiments, only one or more of the electrodes may be selected to carry the guarding signals while the other display electrodes are optionally electrically floated. For example, if the coupling capacitance between the sensor electrodes and the source electrodes 330 is much greater than the coupling capacitance between the sensor electrodes and the gate electrodes 325, the guarding signal may be driven only on the source electrodes 330 and the gate electrodes may be driven or electrically floated.

FIG. 3B illustrates using a display system 390 that uses a charge sharing system to drive the guarding signal onto the source electrodes 330 and common electrodes 350. When performing capacitive sensing, the display system 390 may use logic—e.g., control logic 345 and switching elements 335—already included within the display system 390 such as a charge share system. To use this logic during capacitive sensing, the control logic 345 may disable the source driver and activate switching elements 335 such that the common electrodes 350 are connected to the source electrodes 330. In addition, the control logic 345 instructs the switch 340 (shown here as a mux) to drive the guarding signal 215 onto the common electrodes 350. That is, instead of coupling the common electrodes 350 to the reference voltage Vcom, the common electrodes 350 instead transmit the guarding signal. Because the common electrodes 350 and source electrodes 330 are connected via the switching elements 335, the guarding signal is also driven onto the source lines 330. In this manner, when performing capacitive sensing, the switches 335 in display system 390 enable the transmission of the guarding signal onto source and common electrodes 330, 350 in order to remove the parasitic capacitance between these electrodes and the sensor electrode (not shown).

Although FIG. 3B illustrates using switch 340 to switch between the reference voltage and the guarding signal, this is for illustrative purpose only. In other embodiments, the common electrodes 350 may be coupled to a driver which is capable of driving either the reference voltage or the guarding signal onto the common electrodes 350. Thus, additional hardware may not need to be added to the display system 390 in order to transmit the guarding signals onto the reference and source electrodes 330. Moreover, FIG. 3B illustrates only one example of transmitting the guarding signal onto the source and common electrodes 330, 350 where the display system 390 includes, for example, a charge sharing system. In another embodiment, even if the display system lacks a charge sharing system, the source driver 310 may be used to drive the guarding signal onto each of the source electrodes 330 while a separate driver (not shown) transmits the guarding signal onto the common electrodes 350. That is, even if the source electrodes 330 are not coupled to each other or are not coupled to the common electrodes 350, a display system may be configured to transmit the guarding signal onto the display electrodes.

For example, when the common electrodes 350 are driven with the guarding signal, the gate electrodes 325 and/or the source electrodes 330 may be electrically floated to effectively remove their capacitance from the sensor electrodes. In another example, common electrodes 350 and gate electrodes 325 may be driven with the guarding signal while the source electrodes 330 may be electrically floated. In other examples, common electrodes 350 and source electrodes 330 may be driven with the guarding signal while the gate electrodes 325 may be electrically floated. In yet another example, the gate electrodes 325 may be driven with the guarding signal while the source electrodes 330 and/or common electrodes 350 are electrically floated. In another example, the gate electrodes 325 and source electrodes 330 may be driven with the guarding signal while the common electrodes 350 may be electrically floated. In yet a further example, the source electrodes 330 may be driven with a modulated signal while the gate electrodes 325 and/or common electrodes 350 may be electrically floated. In the above examples, the electrically floated electrode(s) are modulated with the guarding signal via the coupling capacitance between the floated electrode(s) and the driven electrode(s). In other examples, when one of the electrodes (common electrodes 350, gate electrodes 325 and source electrodes 330) is driven with the guard signal at least one other electrode is driven with a substantially constant voltage.

In one embodiment, one or more of the sensor electrodes are disposed between a color filter glass used by the display systems shown in FIGS. 3A and 3B and an input surface of the input device. In one embodiment, a set of sensor electrodes are disposed between the color filter glass of the display device and an input surface of the input device. The electrodes within the display device may comprise one or more display electrodes of the display device—i.e., the electrodes are used both when updating the display and when performing capacitive sensing. In yet another embodiment one or more of the sensor electrodes are disposed between the active layer of the display device and the color filter glass, where the sensor electrodes may also be used as display electrodes of the display device. In a gate-in-panel system, the input device may be able to switch the gate electrodes into a high-impedance state during capacitive sensing.

Figure 4A:
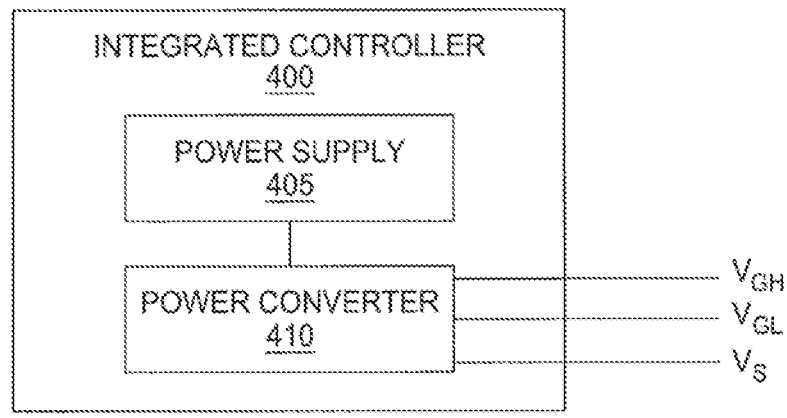
FIGS. 4A-4B illustrate an integrated touch and display controller for guarding gate electrodes in the display system, according to an embodiment described herein.
Figure 4B:
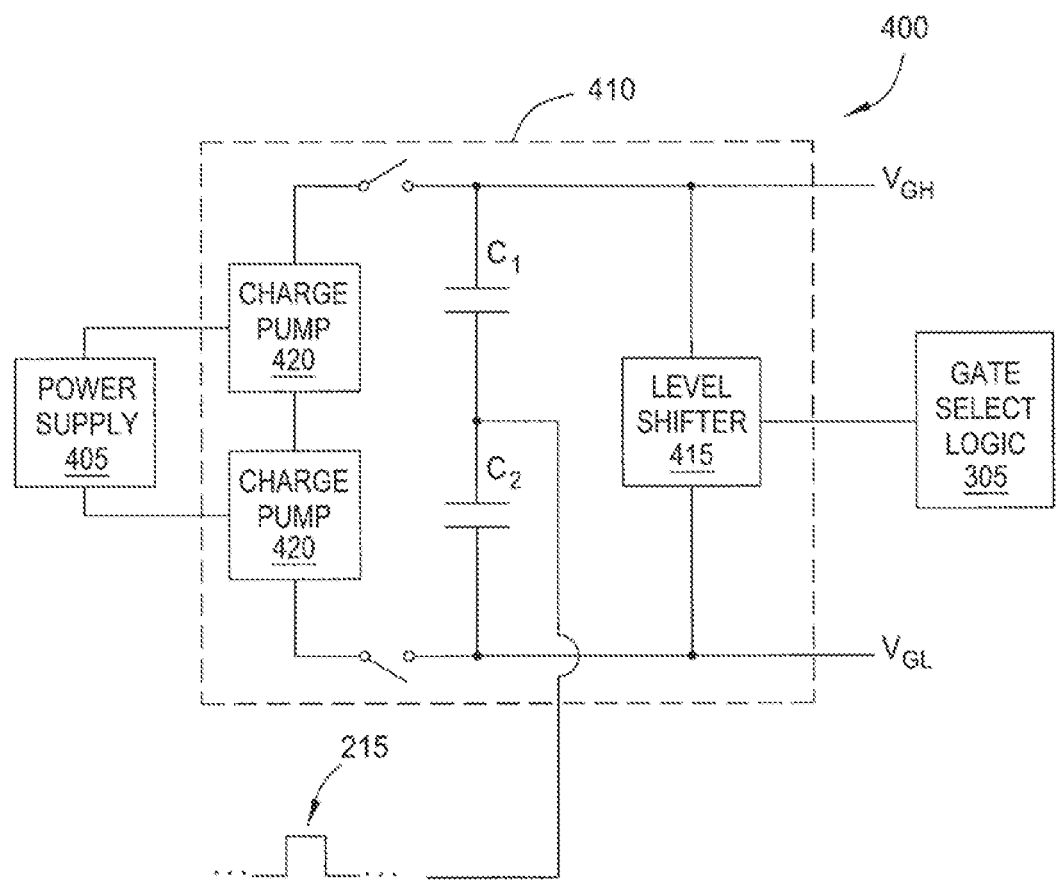

FIGS. 4A-4B illustrate an integrated touch and display controller 400 for guarding gate electrodes in the display system, according to an embodiment described herein. Specifically, the controller 400 may be coupled to the display system 300 in FIG. 3A to drive the guarding signal onto the gate electrodes 325 coupled to the gate select logic 305. In one embodiment, controller 400 may be the processing system 110 shown in FIG. 1A. Furthermore, controller 400 may include the logic necessary to perform both capacitive sensing and display updating in an input device. For example, controller 400 may be a single IC chip. Although not shown, controller 400 may include the control logic 345 shown in FIG. 3A which issues the control signals for driving the guarding signal onto the source and common electrodes as discussed above.

The integrated controller 400 includes a power supply 405 and power converter 410. The power supply 405, which may also be external to controller 400, provides a power signal to the power converter 410 for generating a voltage for the gate electrodes 325 shown in FIG. 3A. Here, the power converter 410 generates a high gate voltage $V_{GH}$ and a low gate voltage $V_{GL}$ which the gate select logic 305 in FIG. 3A may then use to either activate or deactivate a row of pixels 315. In one embodiment, the integrated controller 400 may include the source drivers 310. Accordingly, the integrated controller 400 may provide the source voltage ($V_S$) as well as the gate voltages $V_{GH}$ and $V_{GL}$ to a display screen. In one embodiment, the guarding signal may be generated, either directly or indirectly, by modulating the power supply voltages transmitted to the circuits that drive the display electrodes.

FIG. 4B illustrates a more detailed circuit model of the controller 400. Specifically, the charge pumps 420 generate the gate voltages $V_{GH}$ and $V_{GL}$. For example, the power supply 405 provides power to the charge pumps 420 which generate the gate voltages $V_{GH}$ and $V_{GL}$. In one embodiment, $V_{GH}$ may be approximately 15V while $V_{GL}$ is −10V. To insert the guarding signal 215 onto the gate voltages, the power converter 410 includes a node coupled between reservoir capacitors $C_1$ and $C_2$. These capacitors couple the guarding signal 215 into the DC gate supply voltages generated by the power converter 410. In one embodiment, the node may be coupled to the common electrodes. Accordingly, in this manner, the guarding signal 215 may be driven onto the gate voltages $V_{GH}$ and $V_{GL}$. When the guarding signal 215 is not transmitted, the node between the capacitors $C_1$ and $C_2$ may instead be connected to a DC voltage. In one embodiment, the circuitry (e.g., level shifters 415) may be designed to ensure the individual components can tolerate the voltage swings introduced by the guarding signal 215. Moreover, the level shifters 415, which may be used to level shift the clocks and control signal from the display driver module to the gate select logic 305, is coupled to the power supplies to ensure that the control signals are modulated in a same manner as the power signals ($V_{GH}$ and $V_{GL}$). Doing so automatically guards the control signals as well.

As shown by FIGS. 3A-3B and 4A-4B, the display electrodes (i.e., source, gate, and common electrodes) may drive the guarding signal 215 thereby removing the parasitic capacitance between these electrodes and the sensor electrode. Moreover, appropriately driving the guarding signal on the display electrodes does not affect the voltage stored in the pixel capacitors 320, and thus, does not alter the image currently being displayed on the integrated display screen. Stated differently, because the guarding signal changes the voltage on the display electrodes in the same manner—i.e., the voltage swing on the display electrodes is the same—the pixel transistors remain off which prevents the voltage on the pixel from being corrupted. Accordingly, the voltage potential across the capacitors 320 remains the same thereby maintaining the displayed image. In one example embodiment, the gate-off voltage $V_{GL}$ may swing from −10V to −6V while Vcom/source lines swing from 0V to 4V based on a 4V peak-to-peak guarding signal.

If the guarding signal is applied selectively to the display electrodes—e.g., only to the common electrodes—the guarding signal may be designed such that the signal does not corrupt the image displayed by the pixels. For example, if the common electrodes are driven too far negative with respect to the voltage on the gate electrodes, the switches may activate and cause charge to be lost from the pixels. Losing charge on the pixels may also be prevented by driving the guarding signal only in the positive direction or by reducing the gate-off voltage to prevent activation of the transistor.

Figure 5:
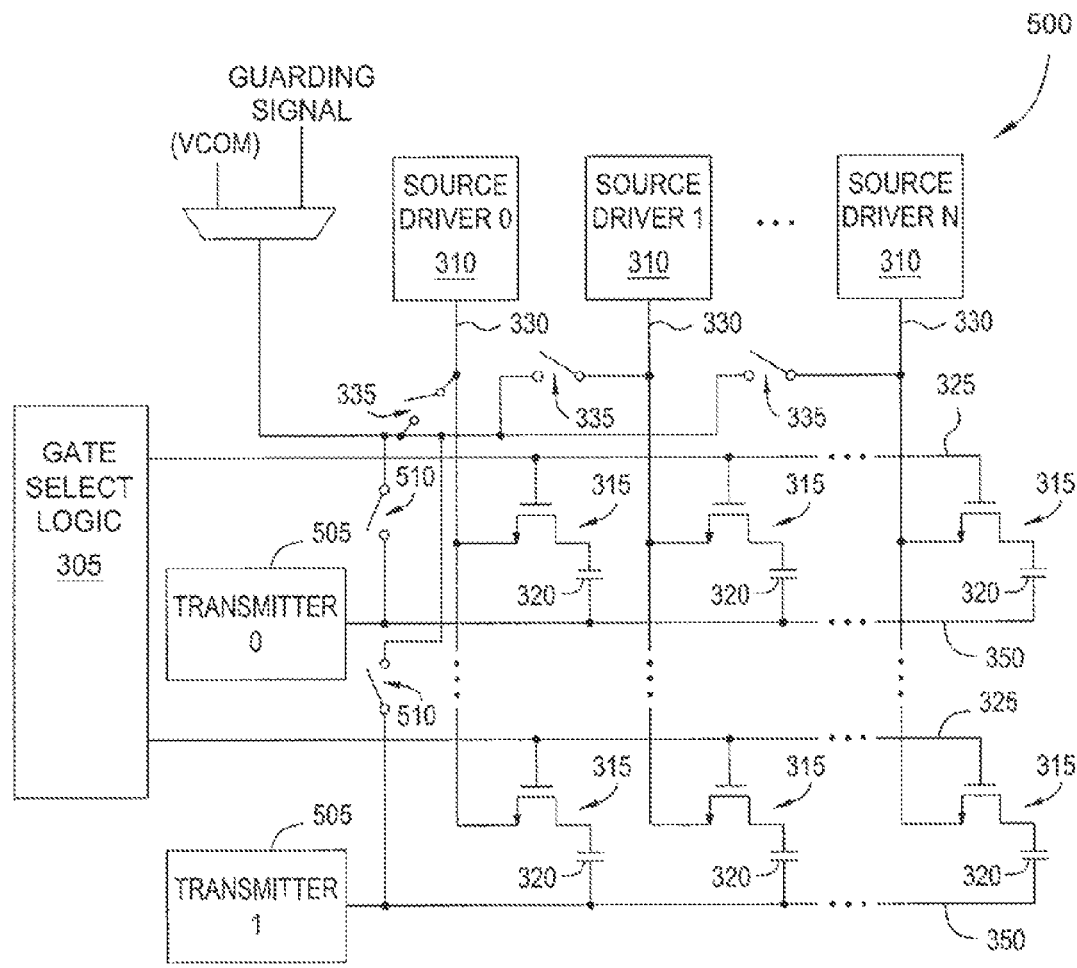
FIG. 5 is a schematic block diagram of a display system where display electrodes are used for performing capacitive sensing, according to an embodiment described herein.

FIG. 5 is a schematic block diagram of a display system 500 where display electrodes are used for performing capacitive sensing, according to an embodiment described herein. Specifically, display system 500 illustrates that the electrodes used when updating the display may also be used as sensor electrodes when performing capacitive sensing. In one embodiment, the common electrodes 350 coupled to the capacitors 320 may be used as one or more of the sensor electrodes 120 shown in FIG. 1A. That is, instead of disposing the sensor electrodes above the display screen, the common electrodes 350 may serve as one or more of the sensor electrodes. To selectively drive a modulated signal on the common electrodes 350, display system 500 includes a plurality of transmitters 505 coupled to a respective common electrode 350. Using the switching elements 510, each common electrode 350 may be electrically isolated from the other electrodes 350 which permits a signal generator 505 to drive a unique signal on the common electrode 350 while the other transmitters 505 may drive a different signal on the other electrodes.

For example, if the common electrodes 350 are currently being used as the sensor electrodes for absolute capacitive sensing, the transmitters 505 may transmit the modulated signal onto the common electrodes 350. To drive the guarding signal onto the source electrodes 330, display system 500 may still use switches 335 to electrically connect the source electrodes 330 to the guarding signal outputted from the mux. Using switching elements 510, the guarding signal may be selectively driven onto common electrodes 350. For example, the guarding signal may be driven on all the common electrodes 350 that are currently not being sensed (i.e., all the electrodes 350 that are not being driven using the transmitter signal). When not performing capacitive sensing, the source electrodes 330 may be disconnected from the common electrodes 350 using switches 335 and the mux may output Vcom on the electrodes 350 using switches 510.

While not illustrated in FIGS. 3A-B and 5, a switching mechanism may be coupled to one or more display electrodes to tri-state or electrically float the display electrodes. This may be coupled to each of the display electrodes or only to subsets of the display electrodes. For example, one or more of the common electrodes, source electrodes and gate electrodes may be coupled to a switching mechanism to electrically float those electrodes.

To form the capacitive profiles or capacitive image, the input device may sequentially drive on all of the common electrodes 350 or raster through each common electrode 350 using the respective transmitter 505 to measure a capacitance value associated with the electrodes 350. In one embodiment, the input device may then sequentially drive through the set of sensor electrodes that are external to the display screen. As such, the guarding signal may be driven on the common electrodes 350 while the modulated signal is driven on the external sensor electrodes.

CONCLUSION

Driving a guarding signal on display electrodes as well as the sensor electrodes currently not being used to make a capacitive measurement may mitigate the effect of the coupling capacitance when measuring capacitance associated with a sensor electrode, reduce power consumption, or improving settling time. In one embodiment, the display electrode may have similar characteristics as the modulated signal (e.g., similar amplitude and/or phase). By driving a guarding signal that is substantially similar to the modulated signal onto the display electrodes, the voltage difference between the sensor electrode and display electrodes remains the same. Accordingly, the coupling capacitance between the sensor electrode and the display electrodes does not affect the capacitance measurement.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. An input device comprising:
a plurality of sensor electrodes each comprising at least one of a plurality of common electrodes of a display, wherein the plurality of common electrodes are configured for display updating and capacitive sensing;
a plurality of display electrodes; and
a processing system coupled to the plurality of sensor electrodes and the plurality of display electrodes, the processing system is configured to:
drive a modulated signal onto a first sensor electrode of the plurality of sensor electrodes to acquire a change of capacitance during a first period, and
operate a first display electrode of the plurality of display electrodes in a guard mode to mitigate an effect of a coupling capacitance between the first sensor electrode and the first display electrode during the first period, wherein mitigating the effect of the coupling capacitance comprises maintaining a constant voltage difference between the first sensor electrode and the first display electrode during the first period.

2. The input device of claim 1, wherein the processing system is configured to, when operating the first display electrode in the guard mode, drive the first display electrode with a guarding signal.

3. The input device of claim 2, wherein the guarding signal and the modulated signal are similar in at least one of phase, amplitude and frequency.

4. The input device of claim 1, wherein the processing system is configured to, when operating the first display electrode in the guard mode, electrically float the first display electrode.

5. The input device of claim 1, wherein the first display electrode is a source electrode.

6. The input device of claim 1, wherein the first display electrode is a gate electrode.

7. The input device of claim 1, wherein the processing system is further configured to operate a second display electrode of the plurality of display electrodes in the guard mode during the first period.

8. The input device of claim 7, wherein the processing system is configured to, when operating the first display electrode in the guard mode, drive the first display electrode with a guarding signal and electrically float the second display electrode.

9. The input device of claim 8, wherein the first display electrode is a source electrode and the second display electrode is a gate electrode.

10. The input device of claim 1, wherein the processing system is configured to drive a second one of the plurality of sensor electrodes with a guarding signal during the first period.

11. The input device of claim 1, wherein the plurality of sensor electrodes are disposed in a common layer.

12. The input device of claim 1, wherein the processing system comprises a first controller configured to drive the modulated signal onto the first sensor electrode and a second controller configured operate the first display electrode in the guard mode.

13. The input device of claim 12, wherein the first controller is synchronized with the second controller.

14. The input device of claim 1, wherein the processing system comprises a controller configured to drive the modulated signal onto the first sensor electrode and configured to operate the first display electrode in the guard mode.

15. A processing system for an input device comprising:
a sensor module comprising sensor circuitry, wherein the sensor module is configured to be coupled to a plurality of sensor electrodes and is configured to drive, during a first time period, a first sensor electrode of the plurality of sensor electrodes with a modulated signal for capacitive sensing, wherein each sensor electrode of the plurality of sensor electrodes comprise at least one of a plurality of common electrodes, wherein the plurality of common electrodes is configured for updating a display of a display device and for capacitive sensing, wherein the first sensor electrode of the plurality of sensor electrodes is capacitively coupled with a first display electrode of a plurality of display electrodes and wherein the first display electrode is configured to be operated in a guard mode during the first time period such that that a voltage difference between the first sensor electrode and the first display electrode remains constant during the first time period.

16. The processing system of claim 15, wherein the sensor module, when operating the first display electrode in the guard mode, is configured to drive the first display electrode with a guarding signal.

17. The processing system of claim 16, wherein the sensor module, when operating the first display electrode in the guard mode, is configured to electrically float the first display electrode.

18. A processing system for a display device, the processing system comprising:
  a display driver module comprising display driver circuitry configured for coupling to a plurality of display electrodes, the display driver module configured to:
    drive a first display electrode of the plurality of display electrodes for display updating, wherein the first display electrode is capacitively coupled to a first sensor electrode, and operate the first display electrode in a guard mode during a first period such that a voltage difference between the first display electrode and the first sensor electrode remains constant during the first period.

19. The processing system of claim 18, wherein the processing system further comprises:
  a sensor module coupled to a plurality of sensor electrodes, the sensor module configured to drive the first sensor electrode with a modulated signal for capacitive sensing.

20. The processing system of claim 19, wherein the display driver module, when operating the first display electrode in the guard mode, is further configured to drive the first display electrode with a guarding signal, wherein the modulated signal and the guarding signal have at least one of a similar phase, amplitude and frequency.

\* \* \* \* \*

UNITED STATES PATENT AND TRADEMARK OFFICE
CERTIFICATE OF CORRECTION

PATENT NO.        : 9,465,482 B2
APPLICATION NO.   : 14/635927
DATED             : October 11, 2016
INVENTOR(S)       : Christopher A. Ludden It is certified that error appears in the above-identified patent and that said Letters Patent is hereby corrected as shown below:

In the Claims

Column 24, Line 42, Claim 12, please insert -- to -- after configured;

Column 24, Line 65, Claim 15, please delete "that that" and insert -- that --, therefor.

Signed and Sealed this
Thirtieth Day of May, 2017

Michelle K. Lee
*Director of the United States Patent and Trademark Office*